(12) United States Patent
Sangawa et al.

(10) Patent No.: US 12,064,723 B2
(45) Date of Patent: Aug. 20, 2024

(54) METHOD FOR OPERATING ADSORPTION DEVICE

(71) Applicant: JGC CORPORATION, Kanagawa (JP)

(72) Inventors: Hiroyuki Sangawa, Kanagawa (JP); Yugo Furubayashi, Kanagawa (JP); Naoki Itcho, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 438 days.

(21) Appl. No.: 17/602,995

(22) PCT Filed: Jun. 25, 2019

(86) PCT No.: PCT/JP2019/025130
§ 371 (c)(1),
(2) Date: Oct. 11, 2021

(87) PCT Pub. No.: WO2020/261375
PCT Pub. Date: Dec. 30, 2020

(65) Prior Publication Data
US 2022/0111327 A1    Apr. 14, 2022

(51) Int. Cl.
*B01D 53/02* (2006.01)
*B01D 53/04* (2006.01)
*B01D 53/26* (2006.01)
*C10L 3/10* (2006.01)

(52) U.S. Cl.
CPC ..... *B01D 53/0438* (2013.01); *B01D 53/0423* (2013.01); *B01D 53/0446* (2013.01);
(Continued)

(58) Field of Classification Search
CPC ........ B01D 2256/245; B01D 2257/304; B01D 2257/504; B01D 2257/80;
(Continued)

(56) References Cited

U.S. PATENT DOCUMENTS 9,687,778 B1 * 6/2017 Fischer ................. B01D 53/28
2010/0043462 A1 * 2/2010 Barot .................... F25B 17/083
62/271
(Continued)

FOREIGN PATENT DOCUMENTS

JP    S57122917    7/1982
JP    S63270522    11/1988
(Continued)

OTHER PUBLICATIONS

Translation of JP2007050378; Air Liquide Japan LTD (Year: 2007).*
(Continued)

*Primary Examiner* — Christopher P Jones
(74) *Attorney, Agent, or Firm* — JCIPRNET

(57) ABSTRACT

In a method of operating an adsorption apparatus including a plurality of adsorption beds each packed with a physical adsorbent, when an adsorption step is performed in a part of the adsorption beds and another adsorption bed is to be regenerated, after the adsorption target component adsorbed on the physical adsorbent is desorbed, a gas for cooling is caused to flow through the another adsorption bed so that the another adsorption bed is cooled until an outlet temperature of the another adsorption bed reaches a temperature set in advance. Further, the cooled adsorption bed stands by for switching to the adsorption step while a gas for standby for maintaining a cooled state is caused to flow through the cooled adsorption bed.

4 Claims, 10 Drawing Sheets

(52) U.S. Cl.
CPC .............. *B01D 53/261* (2013.01); *C10L 3/10* (2013.01); *C10L 3/102* (2013.01); *C10L 3/106* (2013.01); *B01D 2257/80* (2013.01); *B01D 2259/40003* (2013.01); *B01D 2259/4009* (2013.01); *B01D 2259/403* (2013.01); *C10L 2290/542* (2013.01)

(58) Field of Classification Search
CPC .. B01D 2259/40003; B01D 2259/4009; B01D 2259/403; B01D 53/0423; B01D 53/0438; B01D 53/0446; B01D 53/0462; B01D 53/261; C10L 2290/542; C10L 3/10; C10L 3/102; C10L 3/106; Y02C 20/40
See application file for complete search history.

(56) References Cited

U.S. PATENT DOCUMENTS

| | | | |
|---|---|---|---|
| 2011/0005393 A1* | 1/2011 | Howard | B01D 53/0438 95/114 |
| 2011/0100209 A1* | 5/2011 | Henderson | B01D 53/0462 95/26 |
| 2012/0031144 A1* | 2/2012 | Northrop | F25J 3/0266 62/617 |
| 2013/0019751 A1* | 1/2013 | Rost | F23J 15/006 95/186 |
| 2019/0366259 A1* | 12/2019 | Wang | C23C 16/45593 |
| 2020/0355428 A1* | 11/2020 | Coleman | F25J 3/0223 |

FOREIGN PATENT DOCUMENTS

| | | |
|---|---|---|
| JP | H03260588 | 11/1991 |
| JP | 2003038931 | 2/2003 |
| JP | 2004524953 | 8/2004 |
| JP | 2007050378 | 3/2007 |
| JP | 2007063476 | 3/2007 |

OTHER PUBLICATIONS

"International Search Report (Form PCT/ISA/210) of PCT/JP2019/025130", mailed on Sep. 17, 2019, with English translation thereof, pp. 1-4.

* cited by examiner

METHOD FOR OPERATING ADSORPTION DEVICE

CROSS-REFERENCE TO RELATED APPLICATION

This application is a 371 application of the international PCT application serial no. PCT/JP2019/025130, filed on Jun. 25, 2019. The entirety of the above-mentioned patent application is hereby incorporated by reference herein and made a part of this specification.

TECHNICAL FIELD

The present invention relates to a method of operating an adsorption apparatus configured to adsorb an adsorption target component in a gas to be treated through use of a physical adsorbent.

BACKGROUND ART

In some plants configured to process a fluid to be processed, an adsorption apparatus is provided to adsorb and remove impurities (adsorption target components) contained in the fluid to be processed through use of a physical adsorbent.

For example, when a natural gas being a hydrocarbon gas output from a wellhead is to be cooled to produce a liquefied natural gas (LNG), a water removal facility is provided to remove water in the natural gas in order to prevent the water in the natural gas from being solidified at the time of cooling.

As such a water removal facility, in Patent Literature 1, there is described an apparatus which includes a drying device (adsorption bed) packed with a molecular sieve (physical adsorbent) for adsorbing water, and is configured to cause a natural gas to flow through the molecular sieve to remove the water in the natural gas. Further, in Patent Literature 1, there is described a technology of causing a heated gas to pass through a packed bed of the molecular sieve which has adsorbed water, to thereby desorb the water and regenerate the molecular sieve.

Further, in Patent Literature 2, there is described a technology in which, in an air distillation unit including two adsorption beds each packed with a molecular sieve, while an adsorption bed in which water and $CO_2$ are adsorbed and removed to perform purification of air is switched, the other adsorption bed is regenerated. There is further described a problem in that, in this air distillation unit, when one adsorption bed is regenerated to restart the purification of air, heat is generated due to adsorption of nitrogen by the regenerated molecular sieve, and thus a temperature of purified air is increased. In order to address this problem, in Patent Literature 2, there is described a technology of mixing and discharging a high-temperature purified air discharged from the regenerated adsorption bed and a low-temperature purified air discharged from the other adsorption bed, to thereby suppress a flow of high-temperature air to a downstream side of the air distillation unit.

CITATION LIST

Patent Literature

[PTL 1] JP 2003-38931 A
[PTL 2] JP 2004-524953 A

SUMMARY OF INVENTION

Technical Problem

The present invention has been made under the above-mentioned background, and provides a technology capable of suppressing an outflow of a high-temperature gas to a subsequent stage side of an adsorption bed after a regeneration process of desorbing an adsorption target component adsorbed on a physical adsorbent is performed.

Solution to Problem

According to the present invention, there is provided a method of operating an adsorption apparatus configured to adsorb an adsorption target component in a gas to be treated through use of a physical adsorbent, wherein the adsorption apparatus includes a plurality of adsorption beds each packed with the physical adsorbent, each of the plurality of adsorption beds being configured to be switchable between a part of adsorption beds to which the gas to be treated is supplied so that an adsorption step of adsorbing the adsorption target component is performed, and another adsorption bed in which a regeneration step of desorbing the adsorption target component to regenerate the physical adsorbent is performed, wherein the regeneration step includes: a desorption step of heating the physical adsorbent to desorb the adsorption target component; a cooling step of subsequently causing a gas for cooling to flow through the another adsorption bed so as to cool the physical adsorbent having a temperature increased in the desorption step, to thereby cool the another adsorption bed until an outlet temperature of the another adsorption bed reaches a temperature set in advance; and a standby step of thereafter standing by for switching to the adsorption step, and wherein the standby step includes causing a gas for standby for maintaining a cooled state to flow through the another adsorption bed cooled in the cooling step.

Further, the method of operating an adsorption apparatus may include the following features.
  (a) The desorption step includes supplying, to the another adsorption bed, a gas for regeneration for heating and regenerating the physical adsorbent, to thereby desorb the adsorption target component, and the cooling step includes supplying the gas for cooling so as to cool the physical adsorbent having the temperature increased during the desorption step due to the supplying of the gas for regeneration.
  (b) The gas for standby is the gas to be treated.
  (c) The plurality of adsorption beds are provided with a first gas to be treated line for causing the gas to be treated to flow through the part of adsorption beds during the adsorption step, and a second gas to be treated line for causing the gas for standby to flow through the another adsorption bed during the standby step, the second gas to be treated line is connected to the first gas to be treated line, and the standby step includes branching, via the second gas to be treated line, a part of the gas to be treated to be supplied to the part of adsorption beds, to thereby supply the part of the gas to be treated to the another adsorption bed as the gas for standby.
  (d) The gas for standby is supplied to the another adsorption bed at a flow rate smaller than a flow rate of the gas to be treated to be supplied to the part of adsorption beds during the adsorption step.

Advantageous Effects of Invention

According to the present invention, in the method of operating the adsorption apparatus including the plurality of adsorption beds each packed with the physical adsorbent, after the physical adsorbent is heated to desorb the adsorption target component, the gas for cooling is caused to flow through the adsorption bed, to thereby cool the adsorption bed until the outlet temperature of the adsorption bed reaches the temperature set in advance. Further, the cooled adsorption bed stands by for switching to the adsorption step while the gas for standby for maintaining the cooled state is caused to flow through the adsorption bed. Thus, an abrupt temperature increase at the time of switching, which is caused because an internal temperature of the physical adsorbent is not reduced, can be suppressed.

DESCRIPTION OF EMBODIMENTS

Figure 1:
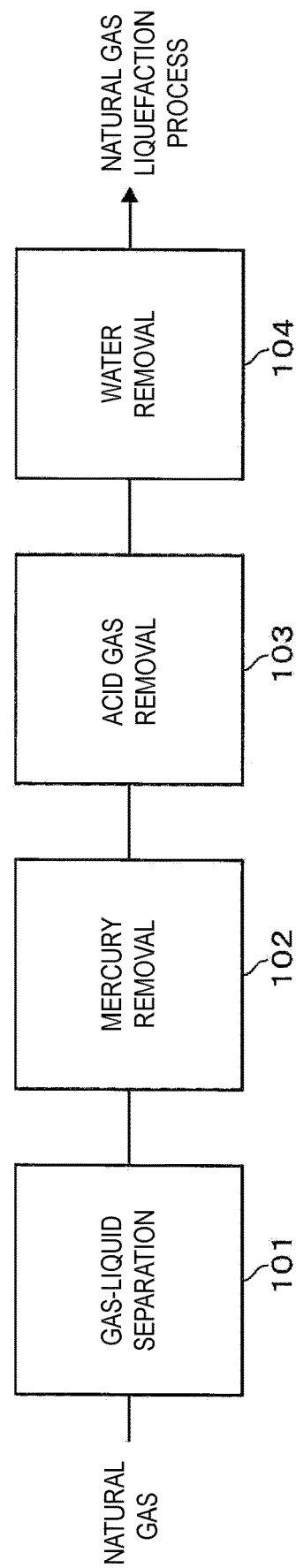
FIG. 1 is a process chart for illustrating pretreatment of a liquefaction process for a natural gas.

First, description is given of a flow of various processes to be performed in a pretreatment facility of a natural gas liquefaction apparatus. As illustrated in FIG. 1, a natural gas output from a wellhead is subjected to, for example, gas-liquid separation 101 and mercury removal 102, and thereafter is further subjected to, for example, acid gas removal 103 through amine washing. The natural gas from which the acid gas such as carbon dioxide or hydrogen sulfide has been removed is further subjected to water removal 104. Then, the natural gas subjected to those steps of pretreatment is transmitted to a liquefaction facility.

Figure 2:
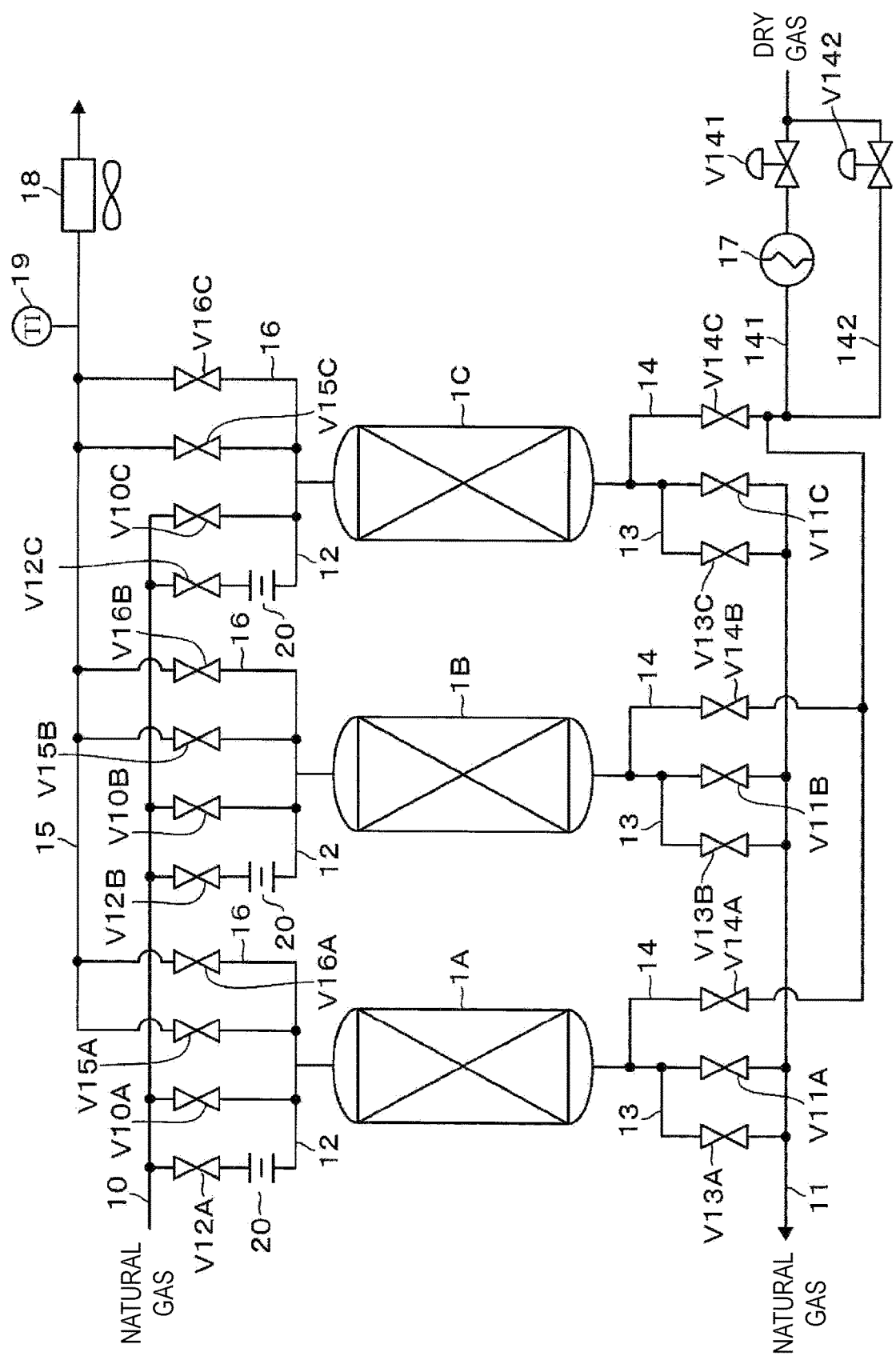
FIG. 2 is a configuration diagram for illustrating a water removal facility.

FIG. 2 is a configuration diagram for illustrating a water removal facility which is to be used in the water removal 104, and corresponds to an adsorption apparatus in this embodiment. The water removal facility includes, for example, three first to third adsorption beds 1A to 1C. The first to third adsorption beds 1A to 1C each have the following configuration. For example, in a container main body made of a metal, a regenerable physical adsorbent, for example, zeolite is packed. The physical adsorbent adsorbs and removes water (adsorption target component) in a natural gas being a gas to be treated.

The first to third adsorption beds 1A to 1C are connected in parallel to each other with respect to a first gas line 10 through which the natural gas subjected to the acid gas removal 103 flows. For example, each of the first to third adsorption beds 1A to 1C is connected to the first gas line 10 so that the natural gas is supplied from an upper portion side (supply side of the natural gas to be subjected to an adsorption process). Further, each of the first to third adsorption beds 1A to 1C is connected to a natural gas transportation line 11 for delivering the natural gas subjected to water removal from a lower portion side (outflow side of the natural gas subjected to the adsorption process) and transmitting the natural gas to the subsequent-stage liquefaction facility. Symbols V10A to V10C of FIG. 2 each represent a valve configured to switch between supply and stop of a natural gas from the first gas line 10 to each of the first to third adsorption beds 1A to 1C. Further, symbols V11A to V11C of FIG. 2 each represent a valve configured to switch between delivery and stop of the natural gas from each of the first to third adsorption beds 1A to 1C to the natural gas transportation line 11.

Further, each of the first to third adsorption beds 1A to 1C is connected to a regeneration gas line 14 for supplying, from the lower portion side of each of the first to third adsorption beds 1A to 1C, a regeneration gas for use to perform regeneration of the physical adsorbent. On the regeneration gas line 14, a heating unit 17 configured to heat a dry gas serving as the regeneration gas is provided. The regeneration gas line 14 includes, for example, a heating gas line 141 for heating a part of the dry gas and supplying the heated dry gas to the regeneration gas line 14, and a non-heating gas line 142 for supplying the dry gas to the regeneration gas line 14 without heating the dry gas. In those heating gas line 141 and non-heating gas line 142, flow regulating valves V141 and V142 are provided, respectively. In this embodiment, a temperature of the dry gas to be supplied to the valves V141 and V142 is, for example, from 230° C. to 300° C. when the dry gas is heated, and from 20° C. to 60° C. when the dry gas is not heated.

Further, a flow rate of the dry gas to be supplied to the regeneration gas line 14 via the heating gas line 141 is controlled by the valve V141. Further, a flow rate of the dry gas to be supplied to the regeneration gas line 14 via the non-heating gas line 142 is controlled by the valve V142. As described above, in this embodiment, the dry gas flowing through the heating gas line 141 and the dry gas flowing through the non-heating gas line 142 are joined to each other so that the temperature of the regeneration gas to be supplied to each of the first to third adsorption beds 1A to 1C can be adjusted. Symbols V14A to V14C of FIG. 2 each represent a valve configured to supply and stop the regeneration gas from the regeneration gas line 14 to each of the first to third adsorption beds 1A to 1C. As the regeneration gas, there is used, for example, a natural gas (dry gas) obtained after the natural gas is subjected to water removal in the water removal facility and delivered to the natural gas transportation line 11.

On each of the upper portion sides of the first to third adsorption beds 1A to 1C, a regeneration gas discharge line 15 for discharging the regeneration gas supplied to the first to third adsorption beds 1A to 1C is provided. On the regeneration gas discharge line 15, a temperature detecting unit 19 configured to detect a temperature of the regeneration gas to be discharged, and a cooler 18 configured to cool the discharged regeneration gas are provided. For example, the cooler 18 is formed of an air fin cooler. Symbols V15A to V15C of FIG. 2 each represent a valve configured to switch between discharge and stop of the regeneration gas from each of the first to third adsorption beds 1A to 1C to the regeneration gas discharge line 15.

Further, in this embodiment, in order to boost a pressure inside each of the first to third adsorption beds 1A to 1C, a natural gas delivered from the first to third adsorption beds 1A to 1C in the adsorption step is used. Specifically, each of the lower portion sides of the first to third adsorption beds 1A to 1C is connected to a pressure-boosting gas line 13 through which a natural gas from a part of the adsorption beds (1B and 1C, 1A and 1C, or 1A and 1B) is caused to flow. Symbols V13A to V13C of FIG. 2 each represent a valve configured to supply and stop the natural gas from the pressure-boosting gas line 13 to each of the first to third adsorption beds 1A to 1C. Further, each of the upper portion sides of the first to third adsorption beds 1A to 1C is connected to a depressurization line 16 for discharging a gas from the first to third adsorption beds 1A to 1C in order to depressurize the inside of each of the first to third adsorption beds 1A to 1C. The depressurization line 16 is formed of a pipe having a diameter smaller than that of the regeneration gas discharge line 15. Symbols V16A to V16C of FIG. 2 each represent a valve configured to allow and stop the depressurization of each of the first to third adsorption beds 1A to 1C via the depressurization gas line 16.

Further, the water removal facility in the embodiment of the present invention includes a second gas line 12 for supplying a natural gas subjected to the acid gas removal 103. The natural gas to be supplied via the second gas line 12 may be supplied at the same rate as or at a rate larger or smaller than the flow rate for supply to the first to third adsorption beds 1A to 1C in the adsorption step via the first gas line 10. In this embodiment, an orifice 20 is provided on the second gas line 12, and thus the second gas line 12 is configured so that its supply flow rate of the natural gas is smaller than the flow rate for supply from the first gas line 10 to each of the first to third adsorption beds 1A to 1C. Symbols V12A to V12C of FIG. 2, which are each provided on the upstream side of the orifice 20, each represent a valve configured to supply and stop the natural gas via the second gas line 12.

Next, description is given of actions of the water removal facility in the embodiment of the present invention. In FIG. 3 to FIG. 9 described below, a solid valve indicates a "closed" state, and an outlined valve indicates an "open" state.

With the above-mentioned water removal facility, when the water in the natural gas is to be removed, for example, a natural gas is supplied via the first gas line 10 to two of the three first to third adsorption beds 1A to 1C so that the water removal process is performed, and the remaining one adsorption bed stands by without being activated. Then, in each of the first to third adsorption beds 1A to 1C, when the water removal process is performed for a time period set in advance (for example, 30 hours), the adsorption performance of the physical adsorbent is reduced, and hence the regeneration process for each of the first to third adsorption beds 1A to 1C is performed.

Figure 3:
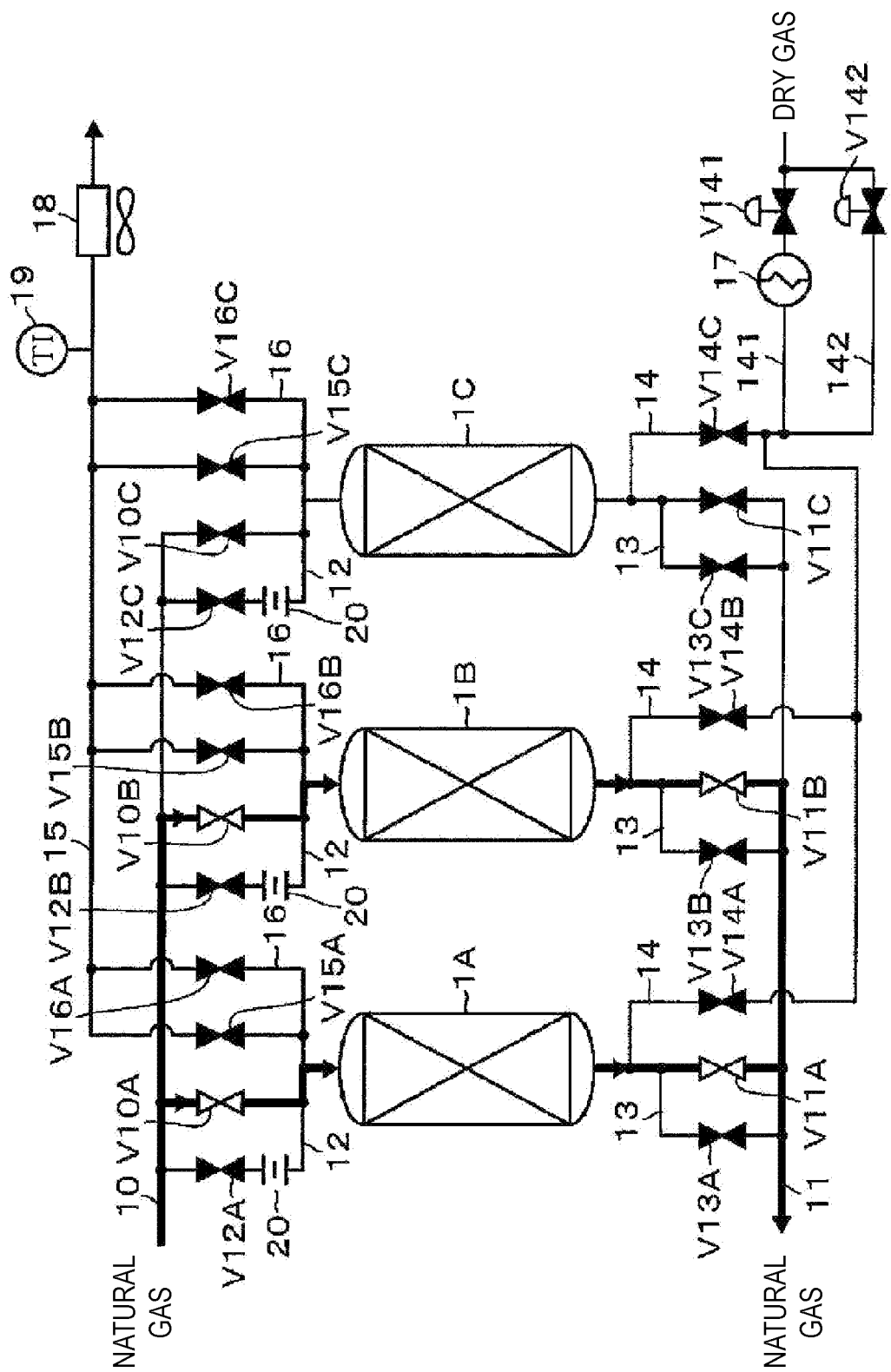
FIG. 3 is an action explanatory diagram for illustrating switching to a regeneration step in the water removal facility.
Figure 4:
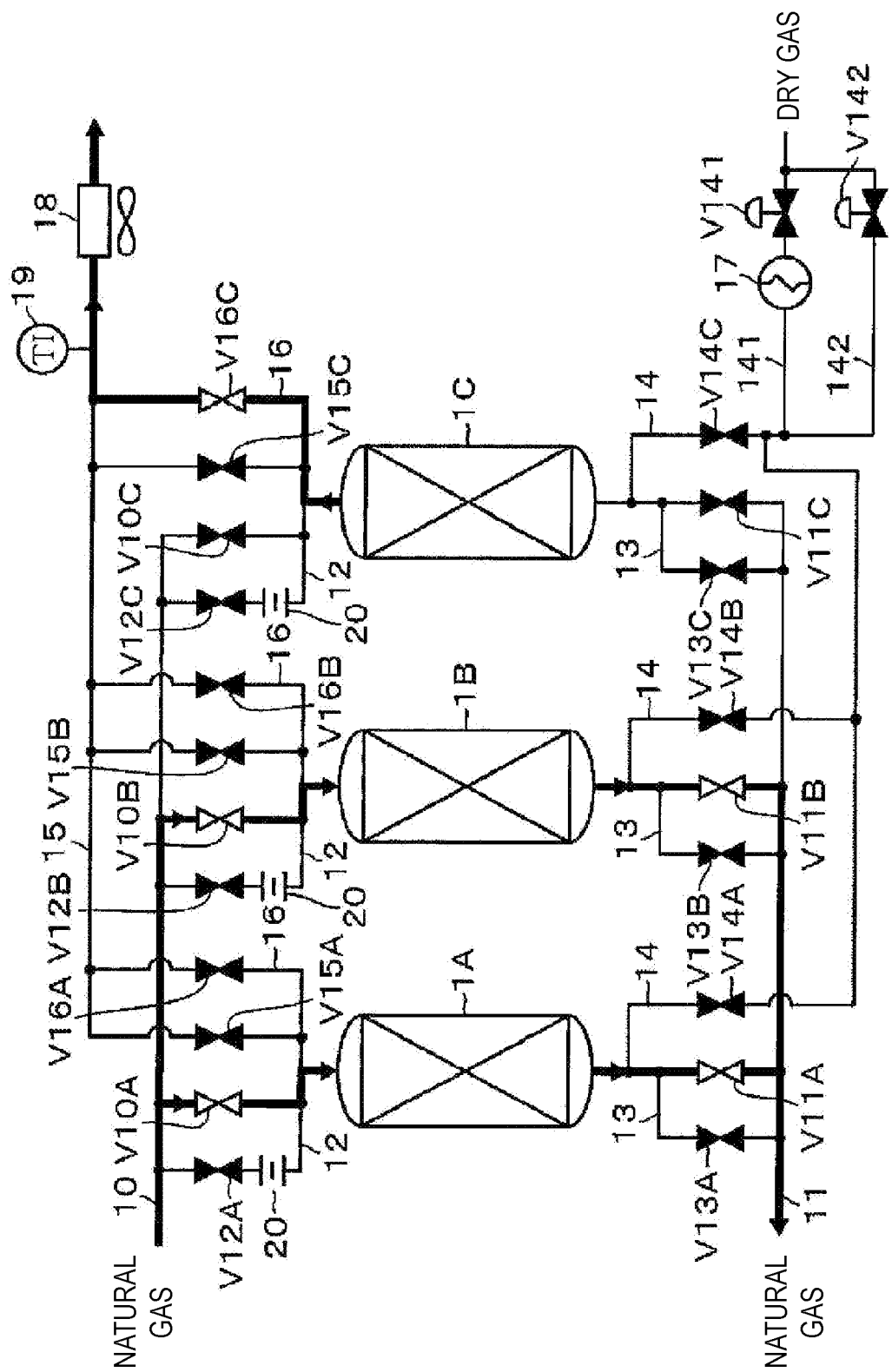
FIG. 4 is an action explanatory diagram for illustrating a depressurization process in the water removal facility.

In the example described below, the water removal of the natural gas is performed in the second and third adsorption beds 1B and 1C, and the first adsorption bed 1A stands by (not shown). In this example, at the timing at which the third adsorption bed 1C is regenerated, as illustrated in FIG. 3, the valves V10C and V11C are closed, and the valves V10A and V11A are opened. In this manner, the supply of the natural gas to the third adsorption bed 1C and the delivery of the natural gas after the water removal are stopped (adsorption step is ended), and the third adsorption bed 1C starts the regeneration process for the physical adsorbent (regeneration step). Then, the activation states of the adsorption beds 1A to 1C are switched so that the first and second adsorption beds 1A and 1B are used to perform the removal process for water in the natural gas (adsorption step). After that, when a differential pressure between the natural gas and the regeneration gas is large, as illustrated in FIG. 4, the valve V16C is opened. Thus, the third adsorption bed 1C is depressurized so that the pressure in the third adsorption bed 1C becomes equal to the supply pressure of the regeneration gas. For example, depressurization is performed from the pressure of 1,220 Psig (8.5 MPa) at the time of the adsorption process to 890 Psig (6.2 MPa).

Figure 5:
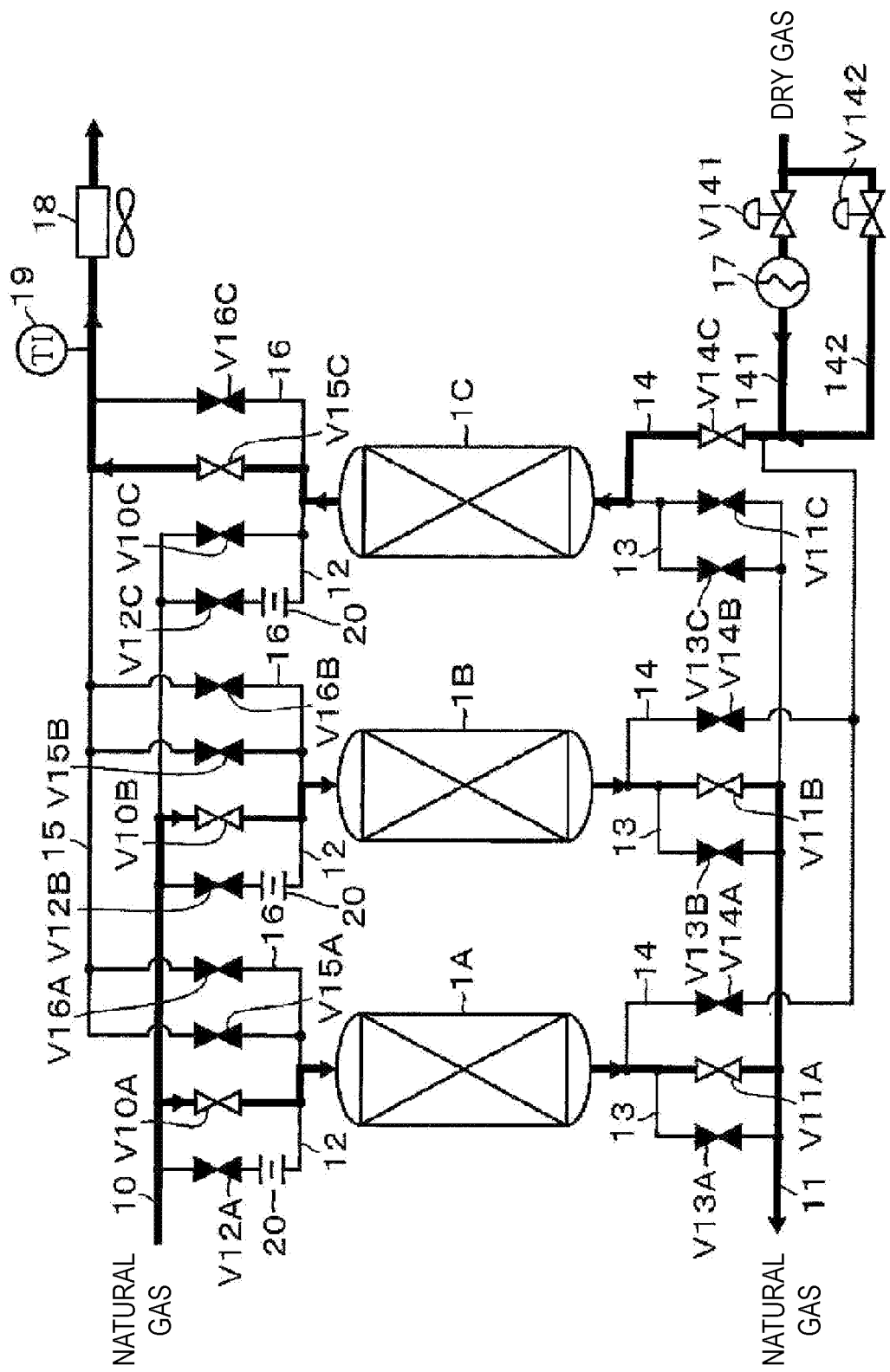
FIG. 5 is an action explanatory diagram for illustrating a desorption step in the water removal facility.

Next, the valve V16C is closed, and further the valve V14C and the valve 15C are opened. In this manner, as illustrated in FIG. 5, a regeneration gas flows through the third adsorption bed 1C. At this time, the heating unit 17 is adjusted so as to heat the dry gas (natural gas after the water removal) of 49° C. to 232° C., and the non-heating gas line 142 supplies the dry gas to the regeneration gas line 14 without heating the dry gas. Then, the flow regulating valves V141 and V142 are adjusted so that a mixing ratio of the heated dry gas and the non-heated dry gas is adjusted, to thereby adjust the temperature of the regeneration gas. In this manner, the third adsorption bed 1C is first increased in temperature from the temperature of 49° C. given after the depressurization to 149° C. and is heated for 3 hours, and is then heated at 232° C. for 6.5 hours. In this manner, the physical adsorbent packed in the third adsorption bed 1C is heated so that the desorption step of desorbing water from the physical adsorbent is performed.

Figure 6:
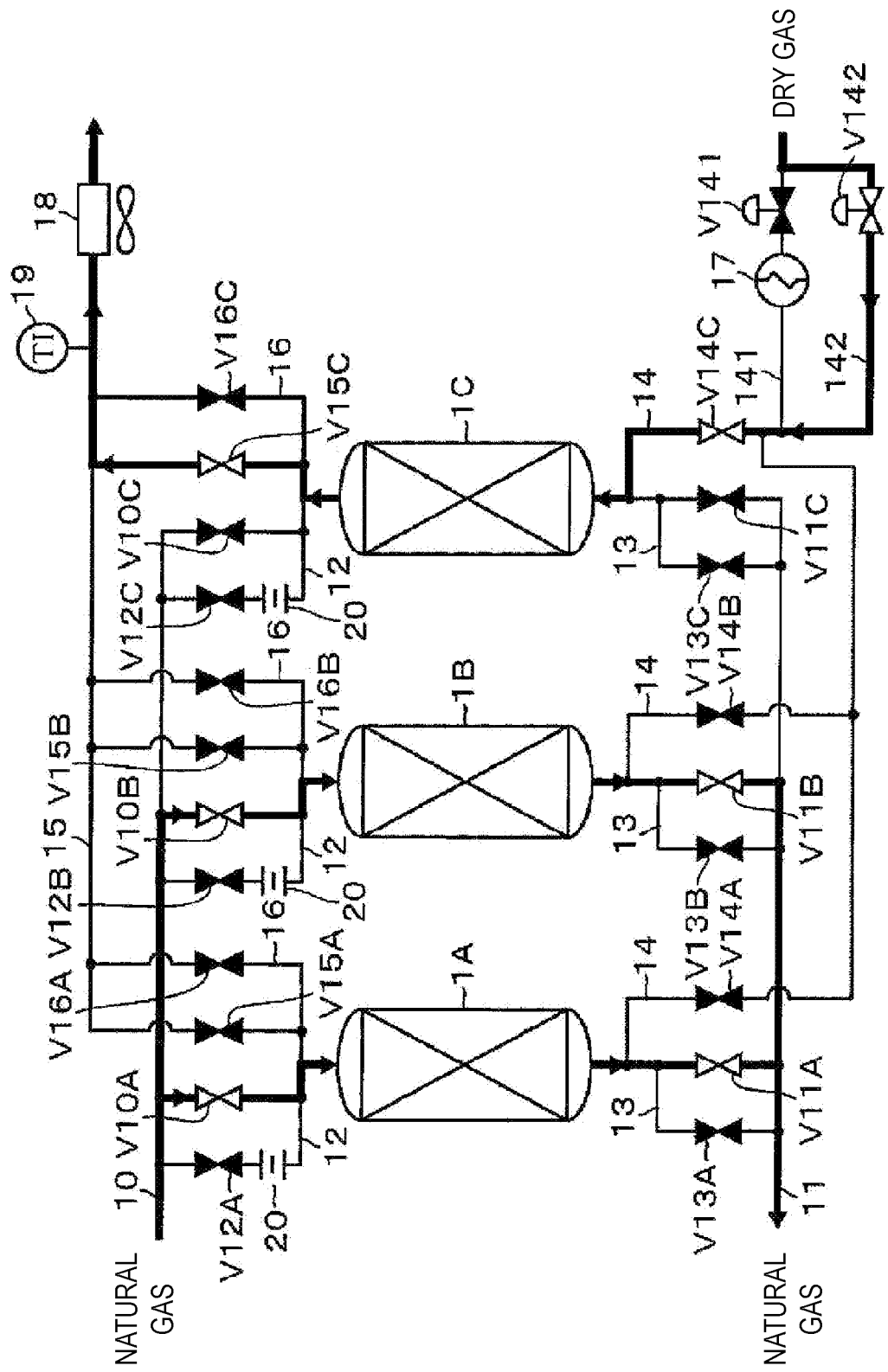
FIG. 6 is an action explanatory diagram for illustrating a cooling step in the water removal facility.
Figure 7:
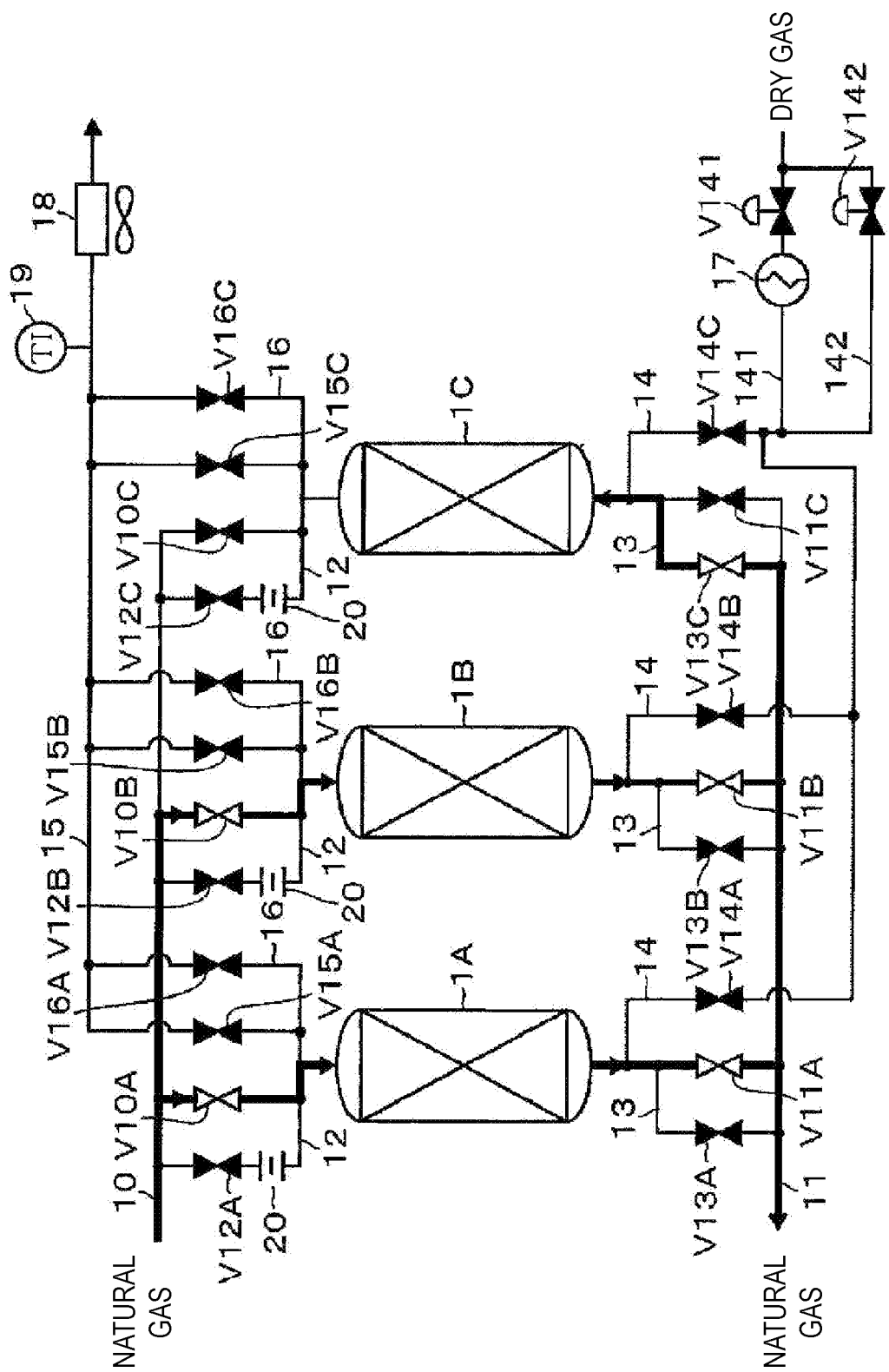
FIG. 7 is an action explanatory diagram for illustrating a pressure boosting step in the water removal facility.

After that, for example, the flow regulating valve V141 is closed, and as illustrated in FIG. 6, the non-heated dry gas is supplied to the third adsorption bed 1C so as to cool the third adsorption bed 1C. In this manner, the third adsorption bed 1C is cooled from the temperature of 232° C. given at the time of the desorption step to 49° C. (cooling step). Then, when the detection temperature obtained by the temperature detecting unit 19 provided on the regeneration gas discharge line 15 reaches a temperature set in advance, for example, 49° C., the valve V15C and the valve V14C are closed. Further, as illustrated in FIG. 7, the valve V13C is opened, and the natural gas subjected to the water removal process in the first and second adsorption beds 1A and 1B is supplied to the third adsorption bed 1C. Thus, a pressure boosting step of boosting the pressure of the third adsorption bed 1C until 1,220 Psig (8.5 MPa) is performed so that the pressure in the third adsorption bed 1C becomes the same as the pressure of the natural gas. After that, the water removal process for a part of the adsorption beds, in this case, the first and second adsorption beds 1A and 1B is performed until the time period set in advance elapses, and the third adsorption bed 1C performs a standby step of standing by for, for example, 1 hour.

In this case, when the regeneration gas for cooling is caused to flow through each of the first to third adsorption beds 1A to 1C to perform cooling, in the physical adsorbent or the container main body forming each of the first to third adsorption beds 1A to 1C, a temperature of a surface in contact with the gas for cooling flowing through each of the first to third adsorption beds 1A to 1C is reduced relatively fast. Meanwhile, the inside of the physical adsorbent or the member forming the container main body may not be decreased in temperature. In such a case, when the supply of the gas for cooling is stopped based on only the detection result of the temperature of the gas delivered from the first to third adsorption beds 1A to 1C (for example, detection result obtained by the temperature detecting unit 19) as a criterion and the gas is brought to a state of being confined in each of the first to third adsorption beds 1A to 1C, during a period of the standby step of each of the first to third adsorption beds 1A to 1C, the temperature of the gas inside each of the first to third adsorption beds 1A to 1C may increase due to the transferred heat (residual heat) from the container main body or the physical adsorbent itself.

In the first to third adsorption beds 1A to 1C in which such a phenomenon is caused, when switching from the standby state (standby step) to the state of performing the removal process for water in the natural gas (adsorption step) is performed, the gas which is increased in temperature inside each of the first to third adsorption beds 1A to 1C during the standby period is delivered toward the downstream liquefaction facility. When a high-temperature natural gas flows to the liquefaction facility, the operation of the downstream liquefaction facility may become unstable, or the high-temperature natural gas may damage an aluminum heat exchanger configured to cool the natural gas.

Figure 8:
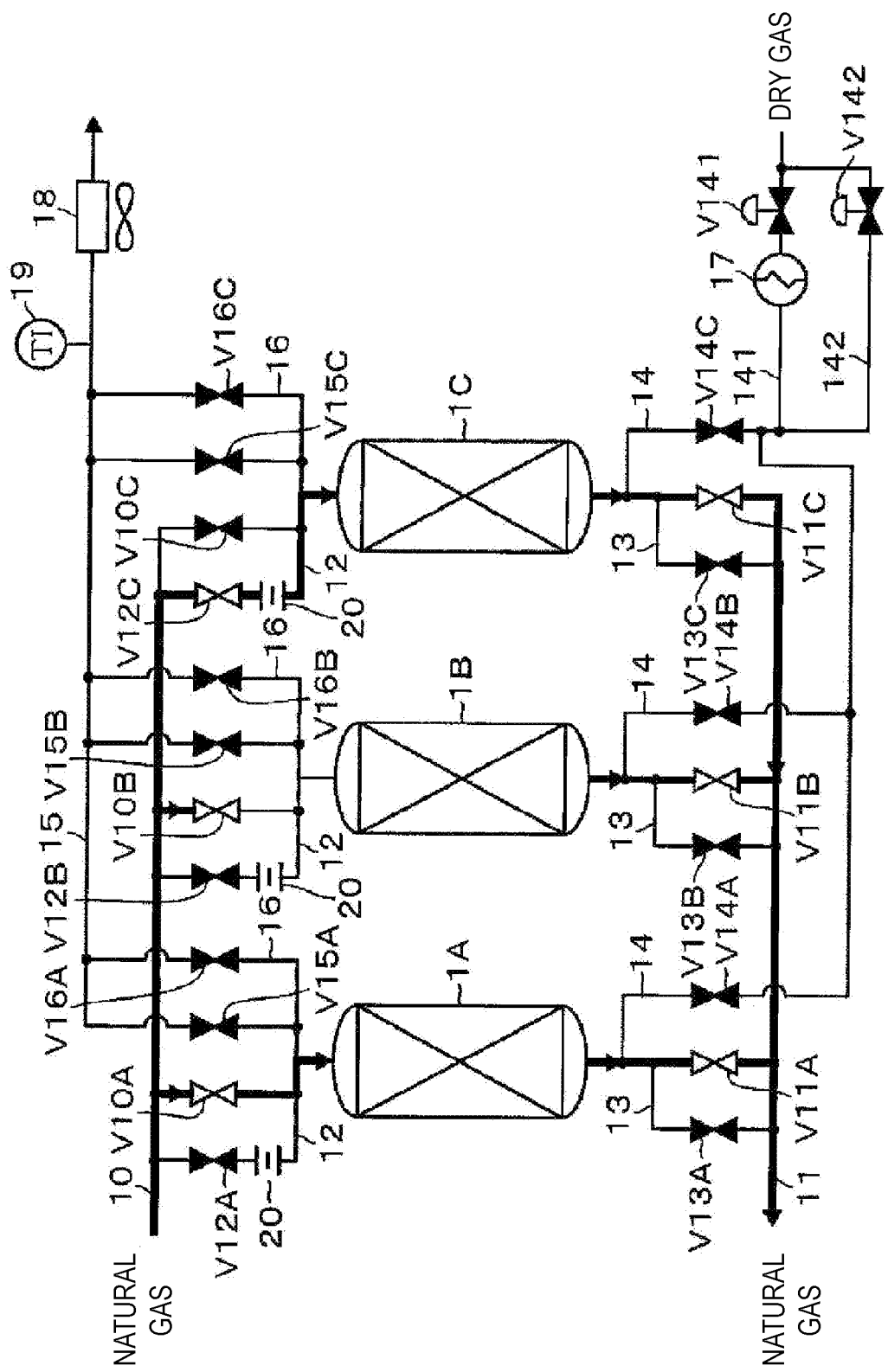
FIG. 8 is an action explanatory diagram for illustrating a standby step in the water removal facility.

In view of the above, in the water removal facility in this embodiment, after the detection temperature obtained by the temperature detecting unit 19 reaches a temperature set in advance and then the pressure in the third adsorption bed 1C is boosted as illustrated in FIG. 7, the valve V12C and the valve V11C are opened as illustrated in FIG. 8. In this manner, a natural gas is supplied to the third adsorption bed 1C via the second gas line 12. As described above, while, among the first to third adsorption beds 1A to 1C, the adsorption bed subjected to the desorption step, for example, the third adsorption bed 1C stands by after the cooling step, the natural gas is caused to flow as a gas for standby through the third adsorption bed 1C. In this manner, the temperature of the physical adsorbent or the container main body of the third adsorption bed 1C subjected to the desorption step can be maintained at a temperature obtained in the cooled state by the cooling step. As described above, when the gas for standby is caused to flow through the third adsorption bed 1C in the standby step, a temperature increase of an internal gas of the third adsorption bed 1C due to the residual heat of the physical adsorbent or the container main body of the third adsorption bed 1C can be suppressed. In this embodiment, the gas to be treated is used as the gas for standby, and hence the temperature of the gas for standby is the same as the temperature of the natural gas, which is, for example, from 20° C. to 60° C.

After that, after the standby time elapses and there arrives a timing to perform the adsorption step of removing water in the natural gas through use of the third adsorption bed 1C, the valve V12C is closed, and the valve V10C is opened. The gas for standby flows through the inside of the third adsorption bed 1C until just before this operation, and hence the temperature increase of the internal gas is suppressed. Thus, delivery of a high-temperature natural gas toward the subsequent stage side of the water removal facility can be suppressed.

According to the above-mentioned embodiment, in the water removal facility including the first to third adsorption beds 1A to 1C each packed with the physical adsorbent, when the adsorption step is performed in a part of the adsorption beds (1B and 1C, 1A and 1C, or 1A and 1B), the regeneration step of the other adsorption bed (1A, 1B, or 1C) is performed. At this time, after a heated gas is supplied to the adsorption bed performing the regeneration step among the first to third adsorption beds 1A to 1C so that the water adsorbed on the physical adsorbent is desorbed (desorption step is performed), the gas for cooling is caused to flow through the adsorption bed subjected to the desorption step (any one of 1A, 1B, and 1C, which is hereinafter also referred to as "regenerated adsorption bed"). Then, the regenerated adsorption bed is cooled until the outlet temperature of the regenerated adsorption bed reaches a temperature set in advance. Further, the regenerated adsorption bed that has been cooled stands by for switching to the adsorption step while a natural gas to be subjected to water removal is caused to flow inside the regenerated adsorption bed. Accordingly, in the regenerated adsorption bed, the temperature increase of the internal gas of each of the first to third adsorption beds 1A to 1C due to the residual heat of the physical adsorbent or the container main body of each of the first to third adsorption beds 1A to 1C can be suppressed. Further, when the switching is performed from the standby state to the state of performing the removal process for water in the natural gas (adsorption step), the temperature increase of the natural gas to be delivered to the downstream side can be suppressed.

Further, the flow rate of the natural gas to be supplied to each of the first to third adsorption beds 1A to 1C in the standby step is set to be smaller than the flow rate of the natural gas to be supplied to each of the first to third adsorption beds 1A to 1C in the adsorption step. In this manner, the amount of water to be adsorbed on the regenerated physical adsorbent can be reduced, and the physical adsorbent can sufficiently exert its performance even after the switching to the adsorption process.

Further, in this example, the first gas line 10 for supplying the natural gas to the first to third adsorption beds 1A to 1C at the time of the adsorption step, and the second gas line 12 for supplying the natural gas to the first to third adsorption beds 1A to 1C at the time of the standby step are provided, and the flow rate of the gas for standby is regulated by the orifice 20. Accordingly, the first gas line 10 and the second gas line 12 can be simply formed with relatively inexpensive components, and thus the facility cost can be reduced.

Further, a pipe having a small pipe diameter may be connected to the delivery side (lower portion side) of each of the first to third adsorption beds 1A to 1C so that, when the natural gas is caused to flow through each of the first to third adsorption beds 1A to 1C in the standby step, the natural gas is delivered via the pipe. When the pipe on the delivery side is formed to have a small diameter, the flow rate of the gas flowing through each of the first to third adsorption beds 1A to 1C can be reduced.

Further, after the regeneration process (desorption step) for each of the first to third adsorption beds 1A to 1C is performed and then the regeneration gas for cooling is supplied, the standby step may be performed, and the pressure of each of the first to third adsorption beds 1A to 1C may be boosted immediately before the process is shifted to the adsorption step. Further, the number of adsorption beds of the present invention may be two, or may be four or more.

Figure 9:
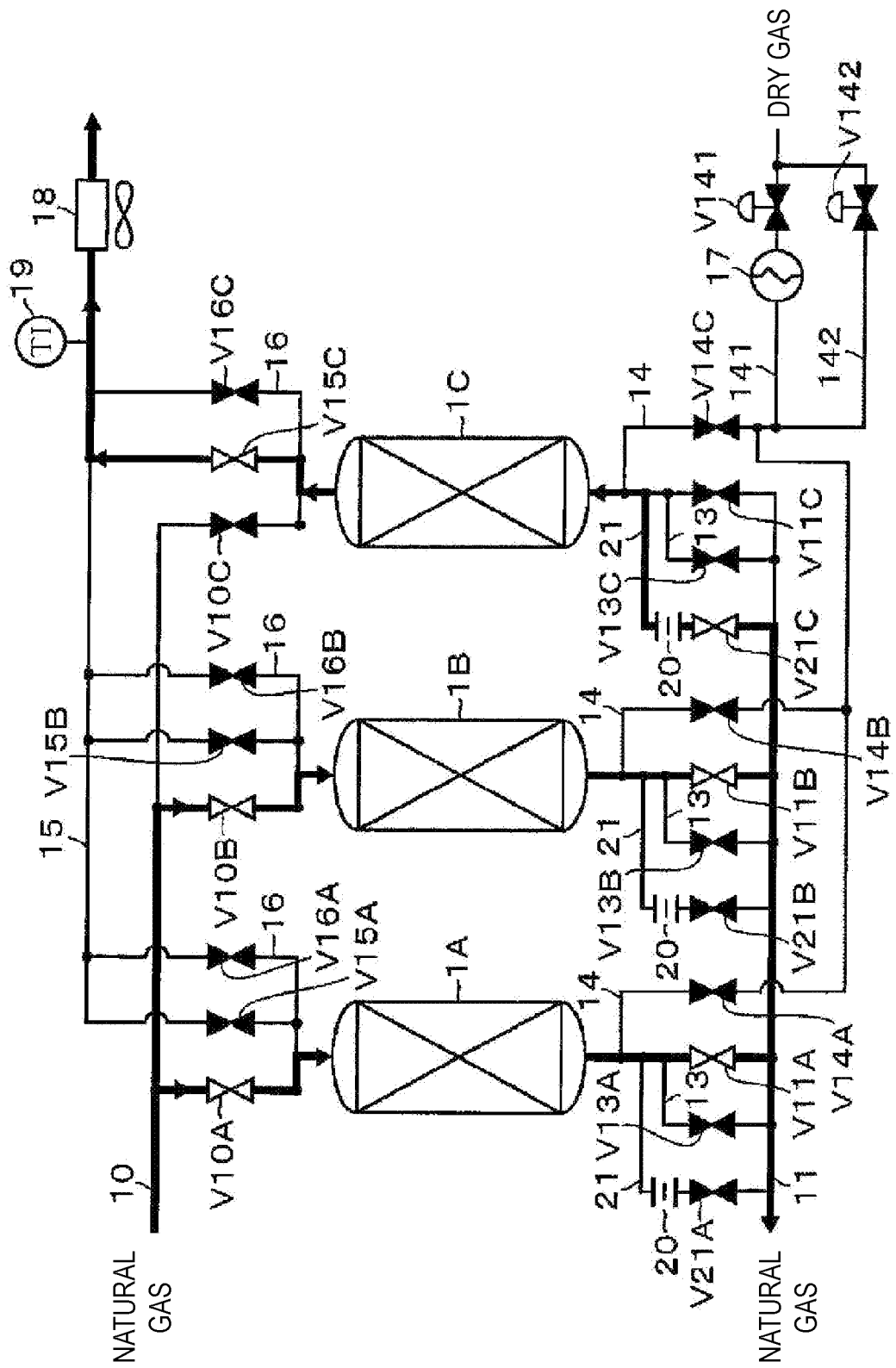
FIG. 9 is an action explanatory diagram for illustrating another embodiment in the water removal facility.

Further, the gas for standby to be supplied to each of the first to third adsorption beds 1A to 1C in the standby step is not limited to the natural gas before the water removal. For example, a natural gas after the water removal may be used. In this case, as illustrated in FIG. 9, a pipe 21 including the orifice 20 may be connected to the delivery side (lower portion side) of each of the first to third adsorption beds 1A to 1C so that the natural gas is caused to flow through each of the first to third adsorption beds 1A to 1C by opening the valves V21A to V21C in the standby step. That is, there may be adopted a configuration in which a natural gas is supplied as the gas for standby from the delivery side at the time of the adsorption step, and the gas is discharged from, for example, the regeneration gas discharge line 15.

However, when, as in the example described above, the standby is performed while the natural gas (gas to be treated) before the water removal is supplied as the gas for standby to each of the first to third adsorption beds 1A to 1C in the standby step, the gas for standby to be delivered from each of the first to third adsorption beds 1A to 1C can be collected as a product gas. Thus, the waste of gas can be reduced.

Figure 10:
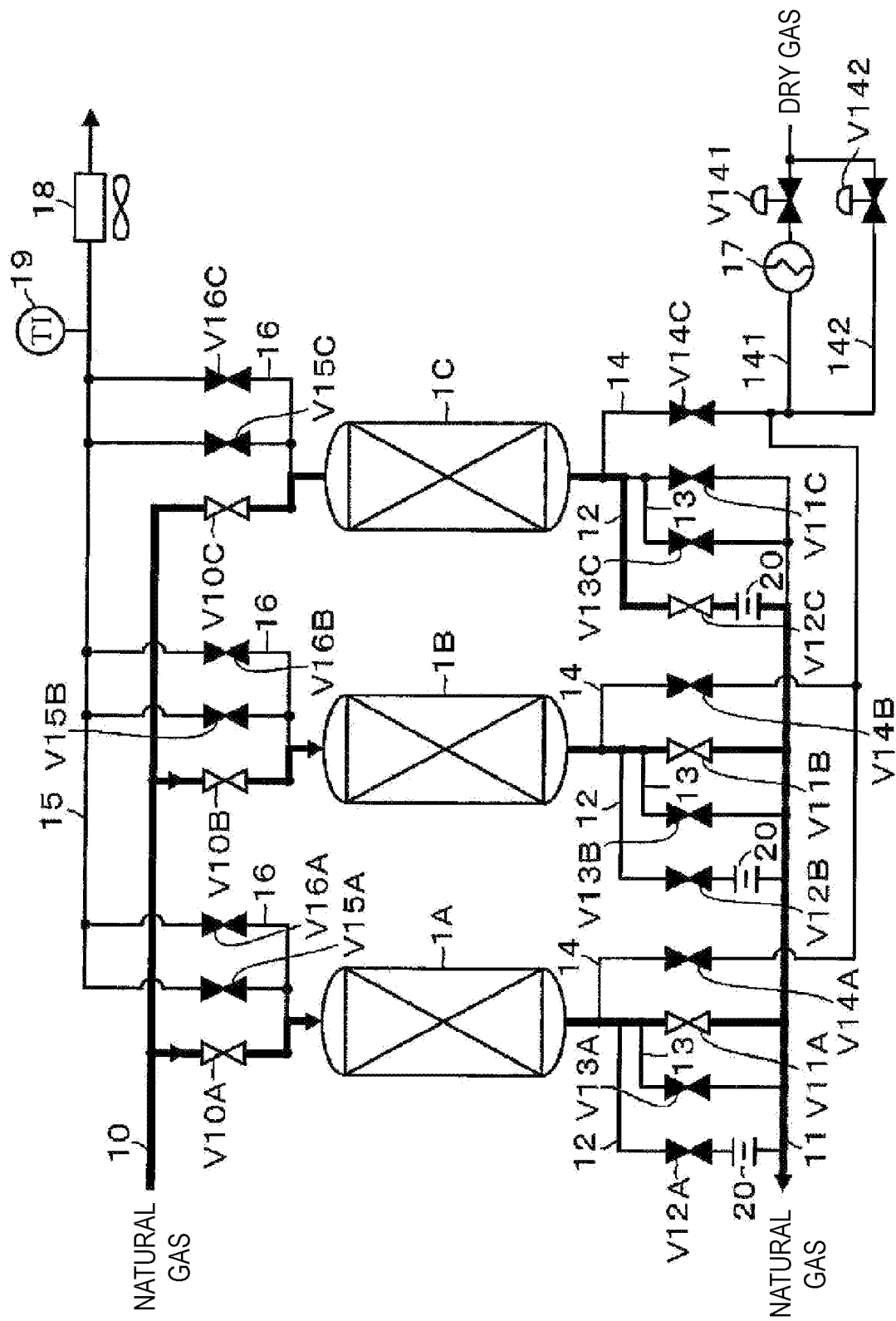
FIG. 10 is an action explanatory diagram for illustrating a different embodiment in the water removal facility.

Further, in this embodiment, there is exemplified a case in which the second gas line 12 is provided on the upper portion sides of the first to third adsorption beds 1A to 1C, but the present invention is not limited thereto. As illustrated in FIG. 10, the second gas line 12 may be provided on the lower portion sides of the first to third adsorption beds 1A to 1C so that the flow rate of the gas for standby is regulated on the outlet side of each of the first to third adsorption beds 1A to 1C.

Further, a method of heating the physical adsorbent at the time of the regeneration step is not limited to the case of supplying the regeneration gas heated by the heating unit 17 to each of the first to third adsorption beds 1A to 1C. For example, water may be desorbed by, while supplying a non-heated regeneration gas (for example, 49° C.), heating the physical adsorbent through use of a heater provided so as to cover the container main body of each of the first to third adsorption beds 1A to 1C.

Further, the gas to be used as the gas for regeneration is only required to be a dry gas. For example, a natural gas from which water has been removed, which is to be delivered from each of the first to third adsorption beds 1A to 1C, can be used. Further, as the gas for regeneration, a boil-off gas (BOG) to be generated in a tank for storing the natural gas, or a product gas or a residue gas to be collected in the subsequent-stage liquefaction facility may be used.

Further, the adsorption target component is not limited to water, and may be, for example, mercaptan. Further, the gas to be treated containing those adsorption target components is not limited to a natural gas, and may be, for example, air or a hydrocarbon gas other than the natural gas. Further, the regenerable physical adsorbent may be activated alumina, silica gel, or the like, other than zeolite.

The adsorption apparatus described above is applicable to a liquefied natural gas (LNG) plant, an oil-to-chemical plant, an ethylene plant, a gas processing plant, or the like.

Further, in this embodiment, there is described a configuration in which the first gas line 10 and the second gas line 12 are provided, and the natural gas flows through different pipes at the time of the adsorption step and at the time of the standby step. However, the present invention is not limited thereto. The natural gas may flow through a common pipe at the time of the adsorption step and at the time of the standby step. In this case, a flow regulating unit (for example, a flow control valve) configured to regulate the flow rate may be provided on the common pipe so that the flow rate at the time of the adsorption step and the flow rate at the time of the standby step are regulated.

Further, in this embodiment, there is exemplified a case in which the orifice 20 is mounted on the second gas line 12 so as to regulate the flow rate of the gas for standby, but a flow control valve may be mounted in place of the orifice 20.

The invention claimed is:

1. A method of operating an adsorption apparatus configured to adsorb an adsorption target component in a gas to be treated through use of a physical adsorbent,
    wherein the adsorption apparatus includes a plurality of adsorption beds each packed with the physical adsorbent, each of the plurality of adsorption beds being configured to be switchable between a part of adsorption beds to which the gas to be treated is supplied so that an adsorption step of adsorbing the adsorption target component is performed, and another adsorption bed in which a regeneration step of desorbing the adsorption target component to regenerate the physical adsorbent is performed,
    wherein the regeneration step includes:
        a desorption step of heating the physical adsorbent to desorb the adsorption target component;
        a cooling step of subsequently causing a gas for cooling to flow through the another adsorption bed so as to cool the physical adsorbent having a temperature increased in the desorption step, to thereby cool the another adsorption bed until an outlet temperature of the another adsorption bed reaches a temperature set in advance; and
        a standby step of thereafter standing by for switching to the adsorption step, and
    wherein the standby step includes causing a gas for standby for maintaining a cooled state to flow through the another adsorption bed cooled in the cooling step, and
    wherein the gas for standby is the gas to be treated.

2. The method of operating an adsorption apparatus according to claim 1,
    wherein the desorption step includes supplying, to the another adsorption bed, a gas for regeneration for heating and regenerating the physical adsorbent, to thereby desorb the adsorption target component, and
    wherein the cooling step includes supplying the gas for cooling so as to cool the physical adsorbent having the temperature increased during the desorption step due to the supplying of the gas for regeneration.

3. The method of operating an adsorption apparatus according to claim 1,
    wherein the plurality of adsorption beds are provided with a first gas to be treated line for causing the gas to be treated to flow through the part of adsorption beds during the adsorption step, and a second gas to be treated line for causing the gas for standby to flow through the another adsorption bed during the standby step,
    wherein the second gas to be treated line is connected to the first gas to be treated line, and
    wherein the standby step includes branching, via the second gas to be treated line, a part of the gas to be treated to be supplied to the part of adsorption beds, to thereby supply the part of the gas to be treated to the another adsorption bed as the gas for standby.

4. The method of operating an adsorption apparatus according to claim 1, wherein the gas for standby is supplied to the another adsorption bed at a flow rate smaller than a flow rate of the gas to be treated to be supplied to the part of adsorption beds during the adsorption step.

* * * * *